United States Patent
Notargiacomo et al.

(10) Patent No.: US 9,807,760 B2
(45) Date of Patent: Oct. 31, 2017

(54) REMOTE UNIT FOR THE DISTRIBUTION OF RADIO-FREQUENCY SIGNALS AND RELATED METHOD FOR THE MANUFACTURE THEREOF

(71) Applicant: TEKO TELECOM S.R.L., Castel San Pietro Terme (IT)

(72) Inventors: Massimo Notargiacomo, Castel San Pietro Terme (IT); Gerardo Guarnieri, Castel San Pietro Terme (IT)

(73) Assignee: Teko Telecom S.r.l., Castel San Pietro Terme (IT)

( * ) Notice: Subject to any disclaimer, the term of this patent is extended or adjusted under 35 U.S.C. 154(b) by 0 days.

(21) Appl. No.: 14/780,478

(22) PCT Filed: Mar. 21, 2014

(86) PCT No.: PCT/IB2014/060040
§ 371 (c)(1),
(2) Date: Sep. 25, 2015

(87) PCT Pub. No.: WO2014/162235
PCT Pub. Date: Oct. 9, 2014

(65) Prior Publication Data
US 2016/0066314 A1 Mar. 3, 2016

(30) Foreign Application Priority Data
Mar. 28, 2013 (IT) .................................. MO13A0081

(51) Int. Cl.
*H04M 1/725* (2006.01)
*H04W 72/04* (2009.01)
(Continued)

(52) U.S. Cl.
CPC .......... *H04W 72/0433* (2013.01); *H04B 1/03* (2013.01); *H04W 16/18* (2013.01); *H04B 2001/3894* (2013.01); *H04W 88/085* (2013.01)

(58) Field of Classification Search
CPC ........................ H04M 1/72527; H04M 1/7253
(Continued)

(56) References Cited

U.S. PATENT DOCUMENTS

2001/0039199 A1* 11/2001 Shinzaki ............. H04M 1/0262
455/572
2006/0236505 A1* 10/2006 Maatta .................. G06F 1/1681
16/366

FOREIGN PATENT DOCUMENTS

CN 102287047 A 12/2011
GB 712826 A 8/1954

OTHER PUBLICATIONS

International Search Report dated Jul. 16, 2014 from International Patent Application No. PCT/IB2014/060040 filed Mar. 21, 2014.
(Continued)

*Primary Examiner* — John J Lee
(74) *Attorney, Agent, or Firm* — Sunstone IP

(57) ABSTRACT

The remote unit for the distribution of radio-frequency signals comprises: a plurality of electronic devices or modules operatively connected to each other for the processing of a radio-frequency signal to distribute within a coverage area, characterized in that it comprises: a first section having at least one of the electronic devices or modules; a second section having at least one of the electronic devices or modules; a connection element having a first portion associated integral with the first section and a second portion, substantially opposite to the first portion and associated integral with the second section; wherein the first section
(Continued)

and the second section are arranged substantially aligned to each other along a longitudinal axis.

12 Claims, 7 Drawing Sheets

(51) Int. Cl.
    *H04B 1/03*         (2006.01)
    *H04W 16/18*      (2009.01)
    *H04B 1/38*         (2015.01)
    *H04W 88/08*      (2009.01)

(58) Field of Classification Search
    USPC ............... 455/575.1, 551, 556.1, 575.6, 90.3
    See application file for complete search history.

(56) References Cited

OTHER PUBLICATIONS

International Preliminary Report on Patentability dated Sep. 29, 2015 from International Patent Application No. PCT/IB2014/060040 filed Mar. 21, 2014.

\* cited by examiner

US 9,807,760 B2

REMOTE UNIT FOR THE DISTRIBUTION OF RADIO-FREQUENCY SIGNALS AND RELATED METHOD FOR THE MANUFACTURE THEREOF

TECHNICAL FIELD

The present invention relates to a remote unit for the distribution of radio-frequency signals and a relative manufacturing procedure.

BACKGROUND ART

With reference to the telecommunications sector and, in particular, the mobile phone industry, the use is known of communications systems for both indoor and outdoor distribution of one or more radio-frequency signals.

The known communication systems may be employed, in particular, to perform the so-called remotization of signals coming from one or more Base Transceiver Stations or similar equipment, for the coverage of signals both within a single band frequency and within multiple frequency bands and/or for different operators.

The known communication systems are commonly made of one or more remote units, suitably installed in the proximity of an area inside which radio coverage is ensured and of a main unit connected to the remote units by means of a communication channel.

The remote units are provided with respective antennas for the transmission of signals or, in case of indoor type systems, connected to a passive distribution network of signals.

With particular reference to the remotization of radio-frequency signals, a communication system of known type, commonly, comprises one or more optical fiber communication channels, able to connect the main unit with one or more corresponding remote units, wherein each remote unit is able to convert the optical signals into corresponding electrical signals, or vice versa, and to amplify these electrical signals, prior to sending them to a transmission antenna. The need is also known to simplify the installation of remote units, in order to speed up their preparation within the radio coverage areas.

The ever increasing need is also known to integrate the remote units to street furniture elements, so as to minimize the aesthetic impact on the surrounding environment.

DESCRIPTION OF THE INVENTION

The main aim of the present invention is to devise a remote unit for the distribution of radio-frequency signals that is compact and easy and quick to install on walls or inside poles or similar supports.

Another object of the present invention is to devise a remote unit for the distribution of radio-frequency signals having a substantially vertical extension.

Another object of the present invention is to devise a manufacturing procedure of a remote unit for the distribution of radio-frequency signals by means of the quick and simple assembly of devices or modules of the conventional type.

Another object of the present invention is to devise a manufacturing procedure of a remote unit for the distribution of radio-frequency signals which allows the assembly of devices or modules of the conventional type with reduced tolerances and, therefore, which ensures minimum overall dimensions of the remote unit itself.

Another object of the present invention is to devise a remote unit for the distribution of radio-frequency signals which allows to overcome the mentioned drawbacks of the prior art in the ambit of a simple, rational, easy and effective to use as well as economic solution.

The above objects are achieved by the present remote unit for the distribution of radio-frequency signals, comprising a plurality of electronic devices or modules operatively connected to each other for the processing of a radio-frequency signal to distribute within a coverage area, characterized in that it comprises:
- at least a first section having at least one of said electronic devices or modules;
- at least a second section having at least one of said electronic devices or modules;
- at least a connection element having at least a first portion associated integral with said first section and at least a second portion, substantially opposite to said first portion and associated integral with said second section;
- wherein said first section and said second section are arranged substantially aligned to each other along a longitudinal axis.

The above objects are also achieved by the present procedure for the manufacture of a remote unit for the distribution of radio-frequency signals, characterized in that it comprises the steps of:
- preparing at least an electronic module or device onto at least a first section;
- preparing at least an electronic module or device onto at least a second section;
- positioning said first section and said second section substantially aligned with each other along a longitudinal axis;
- positioning at least a connection element between said first section and said second section, wherein said connection element has at least a first portion associable with said first section and at least a second portion associable with said second section;
- positioning at least a template in correspondence of said first and second sections and fixing at least a first predefined portion of said template to a corresponding predefined portion of said first section and at least a second predefined portion of said template to a corresponding predefined portion of said second section;
- fixing said first portion of the connection element to said first section and said second portion of said connection element to said second section;
- removing said template from said first and second sections.

BRIEF DESCRIPTION OF THE DRAWINGS

Other characteristics and advantages of the present invention will become more evident from the description of a preferred, but not exclusive, embodiment of a remote unit for the distribution of radio-frequency signals and from the relative manufacturing procedure, illustrated by way of an indicative, but not limitative, example in the accompanying drawings in which.

EMBODIMENTS OF THE INVENTION

Figure 1:
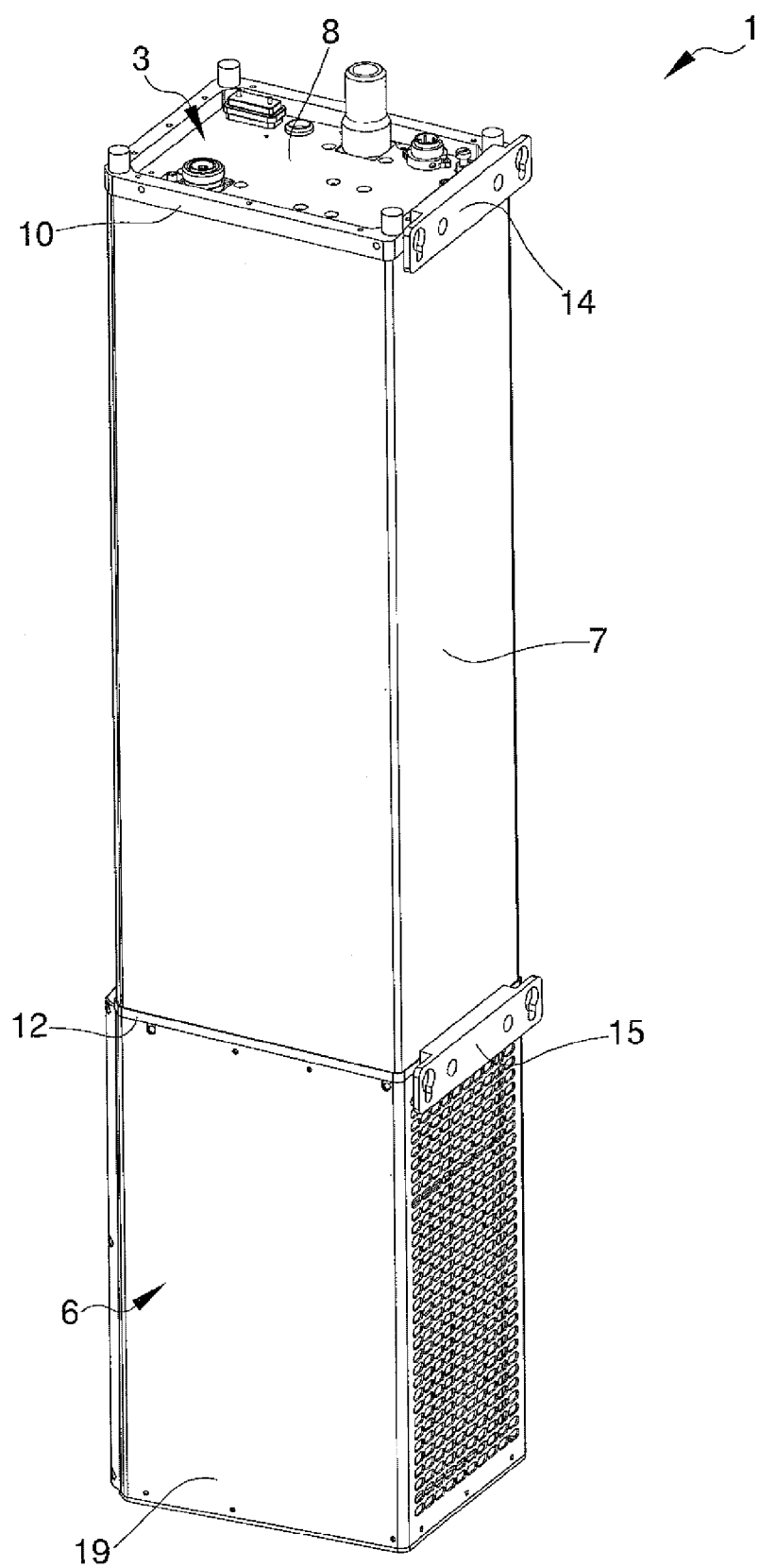
FIG. 1 is an axonometric view of the remote unit according to the invention.
Figure 2:
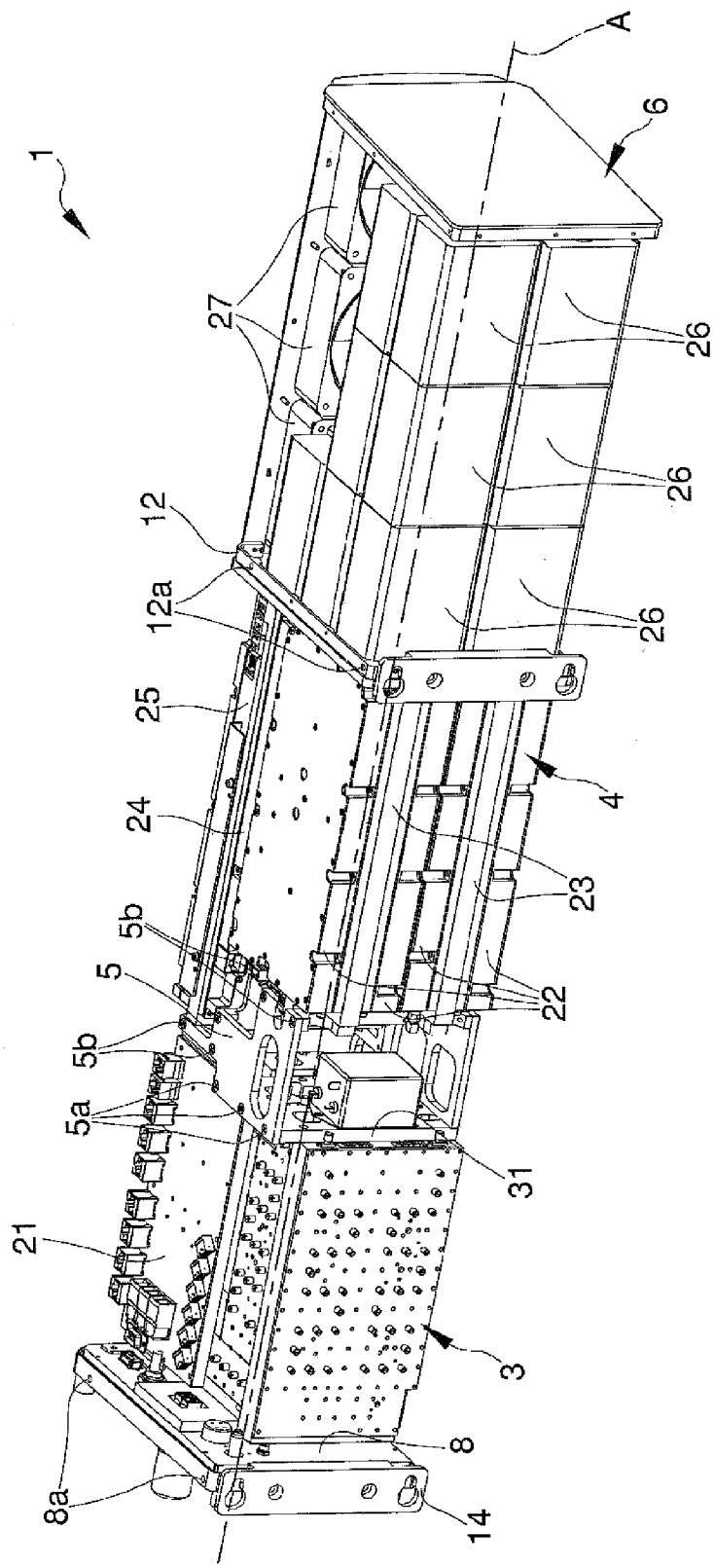
FIG. 2 is an axonometric view of the remote unit according to the invention without the external cover frame.

With particular reference to these figures, globally indicated by 1 is a remote unit for the distribution of radio-frequency signals.

In particular, the remote unit 1 may be used in the telecommunications sector, particularly in the mobile phone industry, for both indoor and outdoor distribution of one or more radio-frequency signals.

The remote unit 1 comprises a plurality of electronic devices or modules operatively connected to each other for the processing of a radio-frequency signal to distribute within a coverage area.

For example, these devices or modules can be composed of:
- an RF filter (RF cavity filter), not shown in the figures;
- a supervision and control module 21, suitable for the management of control signals and of supervision and alarm signals;
- one or more high power amplification modules 22 (High Power Amplifier);
- one or more bases 23 for heat pipe cooling (heat pipe base);
- an optoelectronic module 24;
- a power supply module 25 (PSU—Power Supply Unit);
- one or more coolers 26;
- one or more cooling fans 27.

The remote unit 1 comprises a first section, globally indicated by 3 in the figures, having a plurality of the above mentioned electronic devices or modules connected to each other.

In particular, with non-exclusive reference to the preferred embodiment of the remote unit 1 shown in the figures, the first section 3 comprises an RF filter and a supervision and control module 21.

The remote unit 1 also comprises a second section 4 having a plurality of the above mentioned electronic devices or modules connected to each other.

In particular, still with non-exclusive reference to the preferred embodiment of the remote unit 1 shown in the figures, the second section 4 comprises four high power amplification modules 22, two bases 23 for heat pipe cooling (heat pipe base), an optoelectronic module 24 and a power supply module 25.

Advantageously, the remote unit 1 comprises a connection element 5 having a first portion associated integral with the first section 3 and a second portion, substantially opposite to the first portion and associated integral with the second section 4.

In particular, the first section 3 and the second section 4 are associated integral with each other by means of the connection element 5 and are arranged substantially aligned with each other along a longitudinal axis A.

With non-exclusive reference to the particular embodiment of the remote unit 1 illustrated in the figures, the connection element 5 is substantially plate-shaped.

The connection element 5 has first through holes 5a positioned in correspondence of respective holes 31a obtained along a portion of a first support frame 31 of the first section 3.

Furthermore, the connection element 5 has second through holes 5b positioned in correspondence of respective holes 41a obtained along a portion of a second support frame 41 of the second section 4.

The locking of the connection element 5 on the first support frame 31 and on the second support frame 41 is carried out by means of appropriate threaded means 16, consisting of a series of screws fitted inside first through holes 5a and second through holes 5b and screwed into the holes 31a and 41a.

Usefully, the remote unit 1 comprises a third section, globally indicated in the figures by 6, having a plurality of the above mentioned electronic devices or modules connected to each other.

In particular, with non-exclusive reference to the preferred embodiment of the remote unit 1 shown in the figures, the third section 3 comprises six coolers 26 and three cooling fans 27.

From the coolers 26 extend respective heat pipes 28 which fit within corresponding housings along the bases 23.

The third section 6 is arranged substantially aligned with the first section 3 and with the second section 4 along the longitudinal axis A.

Usefully, the remote unit 1 comprises a covering element 7 substantially tubular, rectangular and elongated that extends around the first and second sections 3 and 4 along the longitudinal axis A.

In particular, a first plate 8 is fixed to the extremity of the first section 3 opposite to the extremity associated with the second section 4.

A first seal 9 is placed between the first plate 8 and the edge of a first extremal opening 7a of the covering element 7.

A small frame 10 fixed along the perimeter of the first plate 8, in correspondence of the edge of the first extremal opening 7a, allows the locking of the first seal 9 on the first plate itself.

Usefully, a third seal 11 is placed between the first plate 8 and the first seal 9 in order to ensure a better seal.

Furthermore, a second plate 12 is placed between the second section 4 and the third section 6, and a second seal 13 is placed between the second plate 12 and the edge of a second extremal opening 7b of the covering element 7.

Usefully, a first bracket 14 is fixed to the first plate 8 and a second bracket 15 is fixed to the second plate 12.

In particular, the first and the second brackets 14 and 15 allow the simple and quick fixing of the remote unit 1 vertically on walls or inside poles.

The manufacturing procedure of the remote unit 1 is described below and is schematically illustrated in Figures from 3 to 7.

Figure 3:
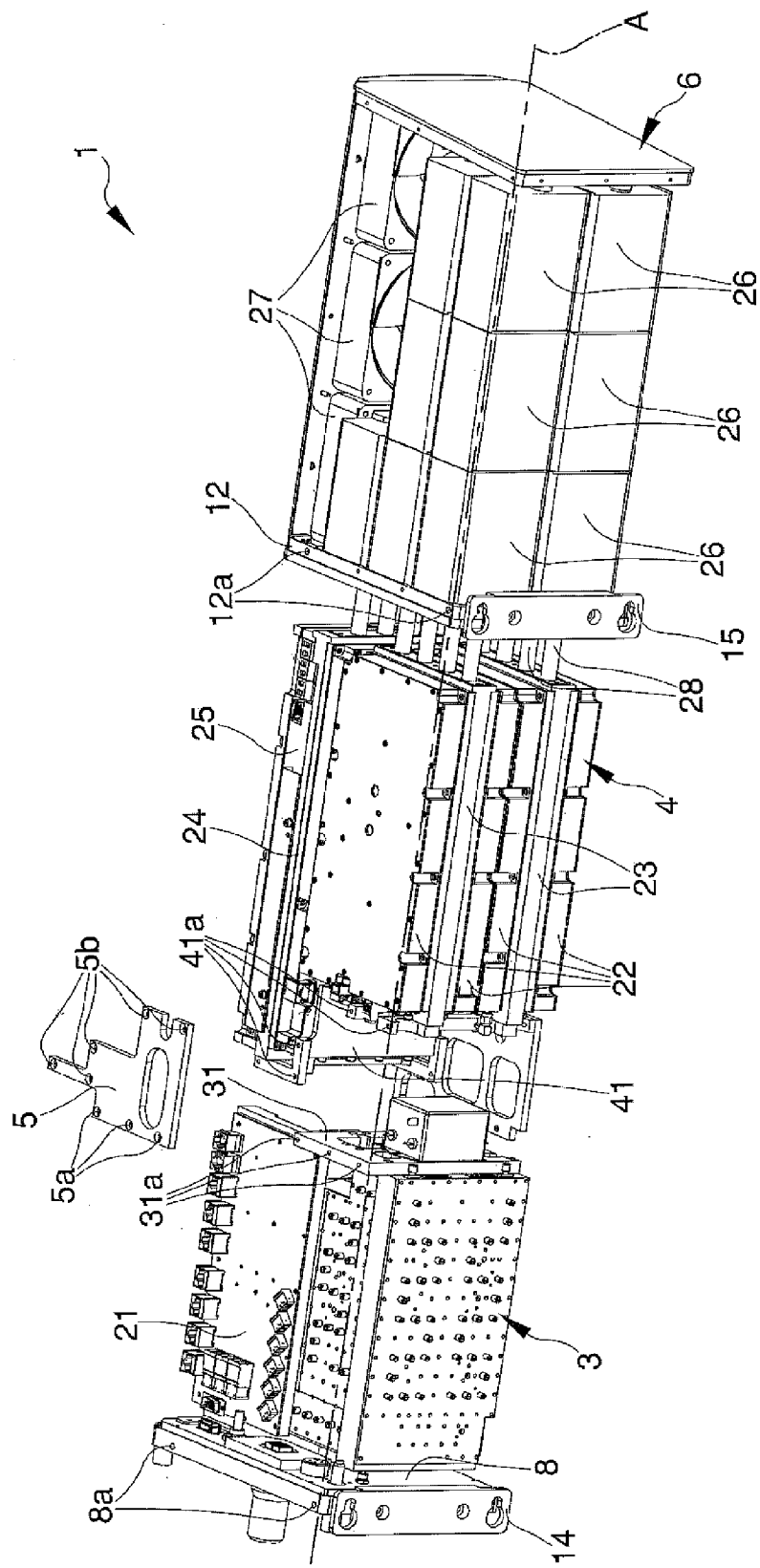
FIGS. 3 to 7 illustrate the procedure of assembly of the remote unit according to the invention.

The procedure involves, first of all, the steps of:
- preparing a plurality of electronic devices or modules on the first section 3;
- preparing a plurality of electronic devices or modules on the second section 4;
- positioning the first section 3 and the second section 4 substantially aligned with each other along the longitudinal axis A (FIG. 3).

Figure 4:
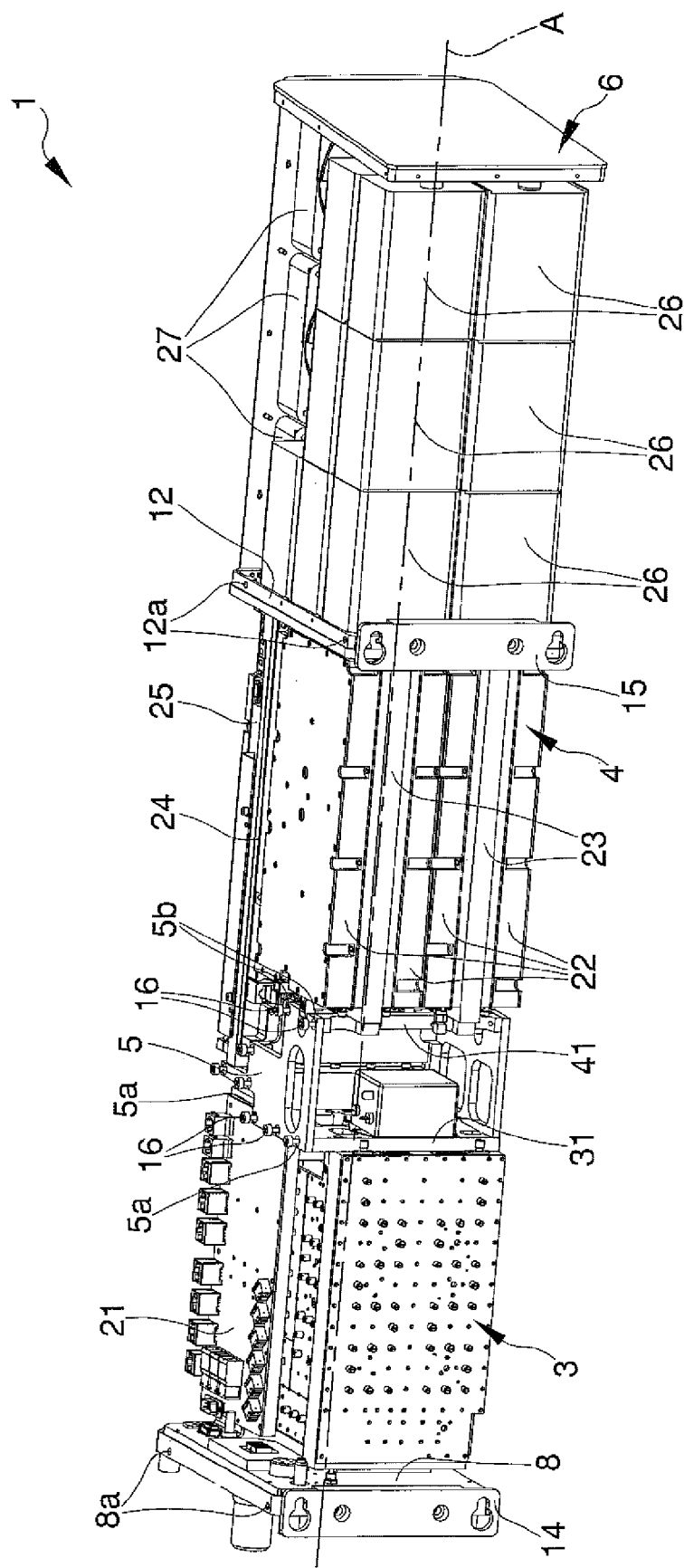

The procedure also involves the fixing of the third section 6 to the second section 4 by means of the plate 12, with the third section 6 arranged substantially aligned with respect to the first section 3 and to the second section 4 along the longitudinal axis A (FIG. 4).

Thereafter, the procedure involves the positioning of the connection element 5 between the first section 3 and the second section 4, with the first through holes 5a substantially aligned with the holes 31a of the first support frame 31 and with the second through holes 5b substantially aligned with the holes 41a of the second support frame 41 (FIG. 4).

Thereafter, the screws 16 are positioned within the holes 31a and 41a, through the first and second through holes 5a and 5b, without being fully tightened.

Figure 5:
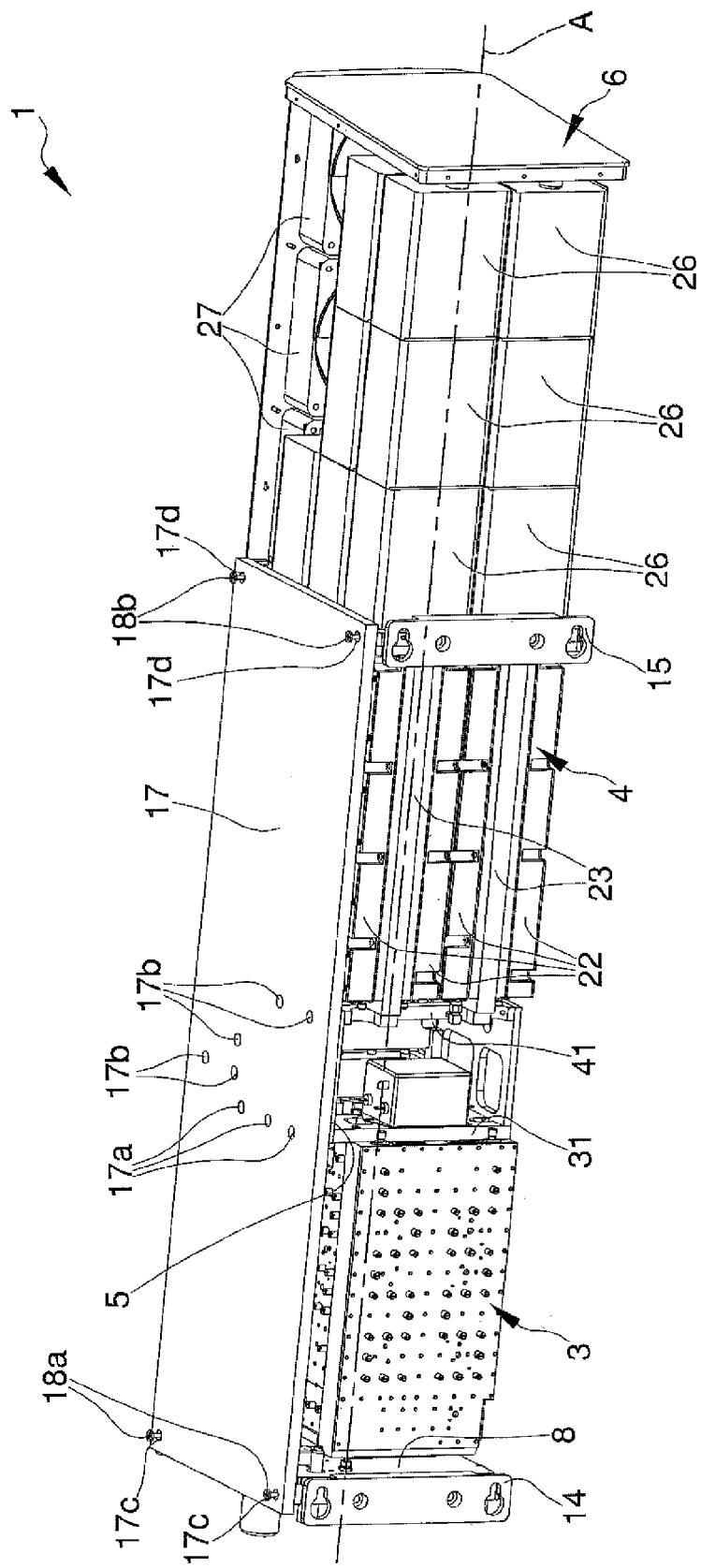

Advantageously, the procedure comprises the step of positioning a template 17 in correspondence of the first and of the second sections 3 and 4 and the step of fixing a first predefined portion of the template 17 to a corresponding predefined portion of the first section 3 and a second predefined portion of the template 17 to a corresponding predefined portion of the second section 4 (FIG. 5).

In particular, with reference to a preferred embodiment shown in the figures, the template 17 is substantially plate-shaped and elongated and has a first extremity provided with first locking holes 17c able to be arranged in correspondence of respective holes 8a made on the first plate 8.

The template 17 also has a second extremity provided with second locking holes 17d able to be arranged in correspondence of respective holes 12a made on the first plate 12.

The locking of the template 17 on the first section 3 and on the second section 4 is made by means of appropriate screws 18a inserted in the first locking holes 17a and screwed into the holes 8a of the first plate 8, and by means of appropriate screws 18b inserted in the second locking holes 17c and screwed into the holes 12a of the second plate 12.

Advantageously, the template 17 is provided with appropriate first through openings 17a made in correspondence of first through holes 5a on the connection element 5 and with second through openings 17b made in correspondence of second through holes 5b on the connection element 5, which are able to allow the tightening of the screws 16.

Figure 6:
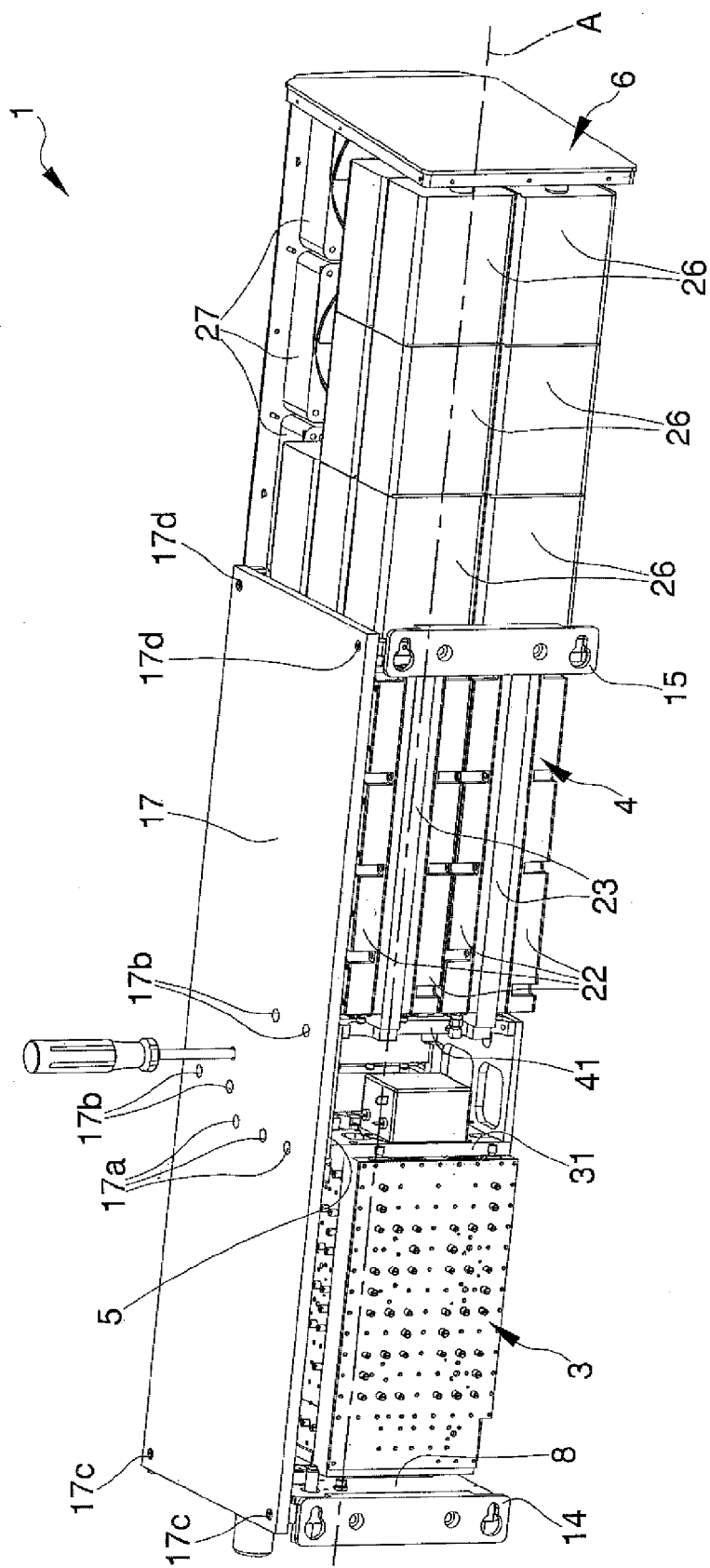

The procedure involves, therefore, the fixing of the connection element 5 to the first support frame 31 and to the second support frame 41 by fully tightening the screws 16, through the first and second through openings 17a and 17b (FIG. 6).

Thereafter, the procedure involves the removal of the template 17 from the first and from the second sections 3 and 4.

Figure 7:
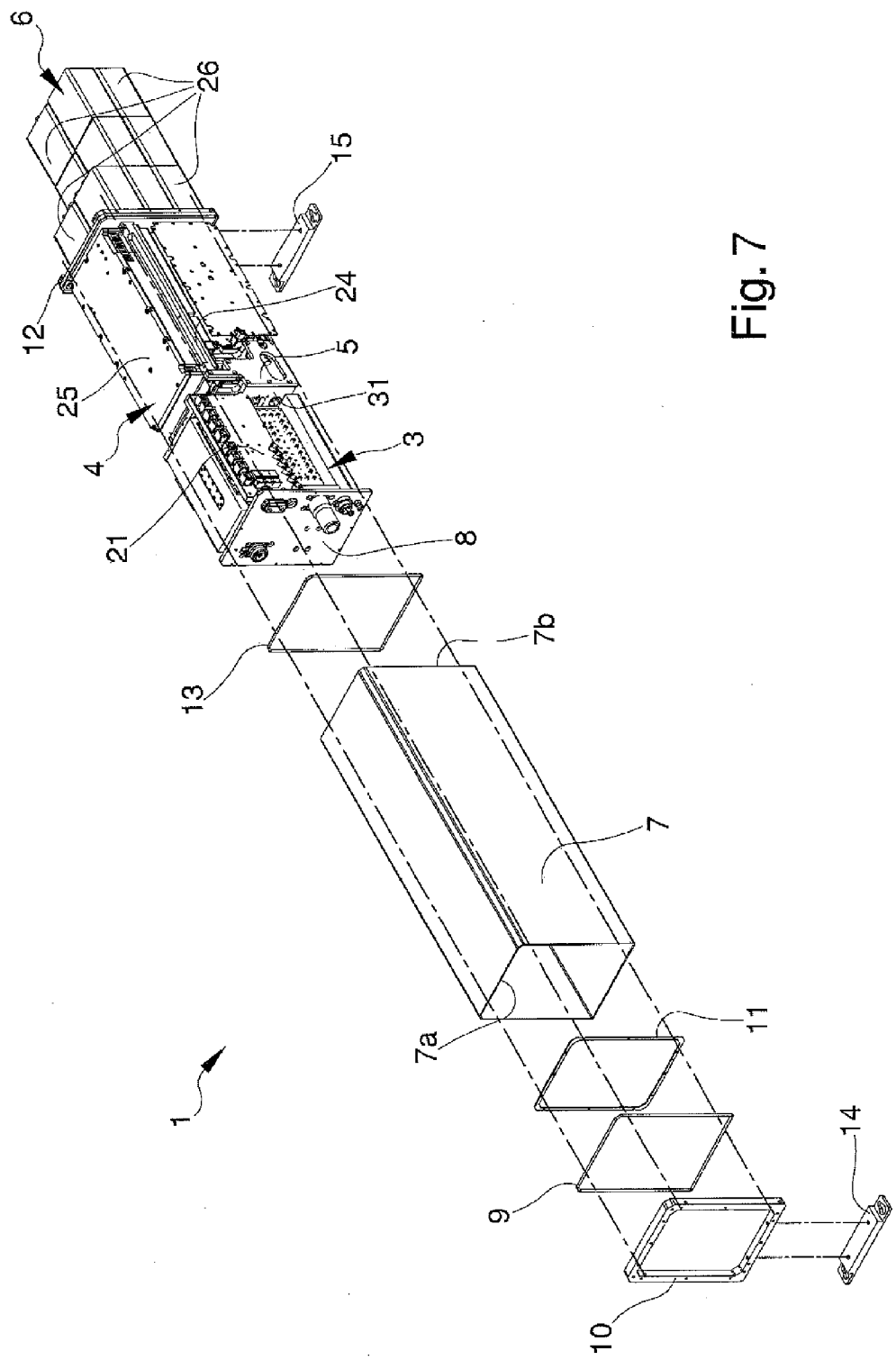

Thereafter, the positioning and the locking of the covering element 7 is carried out around the first and the second sections 3 and 4 and along the longitudinal axis A (FIG. 7).

In particular, in order to ensure an IP protection degree of the remote unit 1 of the IP66 type (enclosure totally protected against dust and protected from waves), the procedure involves the positioning of the second seal 13 in correspondence of the second plate 12, and the subsequent insertion of the covering element 7, and the positioning of the edge of the second extremal opening 7b in correspondence of the second seal 13.

Moreover, the third seal 11 is positioned in contact with the first plate 8, along the edge, and the small frame 10 is fixed by means of threaded means to the first plate 8 with interposition of the first seal 9.

Usefully, the tightening of the threaded means on the small frame 10 allows to press all seals 9, 11 and 13 within their respective housings, ensuring an IP66 protection degree of the whole enclosure.

Furthermore, this particular type of assembly makes opening/closing operations of the remote unit 1 easier, thus reducing significantly the total time required for such operations.

The procedure also involves the positioning and fixing of a further protective cover 19 around the third section 6.

It is found in practice how the described invention achieves the proposed objects.

In particular the fact is underlined that the remote unit according to the invention is compact and easy and quick to install on walls or inside poles or similar supports.

In particular, the remote unit according to the invention can be installed inside poles having a radius equal to 12 inches.

Furthermore, the remote unit according to the invention extends along a vertical direction.

The remote unit according to the invention can be achieved by means of the simple and quick assembly of devices or modules of conventional type.

Furthermore, the remote unit according to the invention allows the assembly of devices or modules of conventional type with reduced tolerances; thus ensuring minimum overall dimensions of the remote unit itself.

In particular, the structure of the remote unit according to the invention allows to avoid the use of longitudinal bars or frames of conventional type, thus increasing the space usable for the installation of electronic modules and devices and also reducing significantly the overall weight.

Moreover, as known, in the event of individual modules with specific mechanical tolerances required being connected together by means of screws or the like to achieve the individual sections, then the total length of each section requires greater mechanical tolerance, that is further increased when the three sections are connected together.

Otherwise, with reference to the manufacturing procedure of the remote unit according to the invention, the use of the particular connection element, able to connect the first section and the second section, together with the use of the particular template during assembly, allow to significantly reduce the overall mechanical tolerances.

The procedure according to the invention allows an optimization of the manufacturing costs, since it allows the use of most of the modules generally used in remote units of conventional type.

In particular, conventional HPA, PSU modules, supervision modules, PSU, optical modules, cavity filters may be used.

Furthermore, the remote unit according to the invention is provided with a housing with a high IP protection degree (IP66).

The invention claimed is:

1. A remote unit for the distribution of radio-frequency signals, comprising a plurality of electronic devices or modules operatively connected to each other for the processing of a radio-frequency signal to distribute within a coverage area, and comprising:
 at least a first section having at least one of said electronic devices or modules;
 at least a second section having at least one of said electronic devices or modules;
 at least a connection element having at least a first portion associated integral with said first section and at least a second portion, substantially opposite to said first portion and associated integral with said second section, wherein said first section and said second section are arranged substantially aligned to each other along a longitudinal axis;
 at least a covering element substantially tubular and elongated which extends around said first and second sections along said longitudinal axis; and
 at least a first seal placed between said first section and the edge of a first extremal opening of said covering element and a second seal placed between said second section and the edge of a second extremal opening of said covering element.

2. The remote unit according to claim 1, wherein at least one of said first section and said second section comprises a plurality of said electronic devices or modules associated with each other.

3. The remote unit according to claim 1, wherein said electronic devices or modules are selected from the group comprising: a RF filter, a supervision and control module, a high power amplification module, a base for heat pipe cooling, an optoelectronic module, a power supply module, a cooler, a cooling fan, a heat pipe.

4. The remote unit according to claim 1, further comprising at least a third section having at least one of said electronic devices or modules and associated with at least one of said first section and said second section.

5. The remote unit according to claim 4, wherein said third section is arranged substantially aligned with said first section and with said second section along said longitudinal axis.

6. A procedure for the manufacture of a remote unit for the distribution of radio-frequency signals, comprising the steps of:
  preparing at least an electronic module or device onto at least a first section;
  preparing at least an electronic module or device onto at least a second section;
  positioning said first section and said second section substantially aligned with each other along a longitudinal axis;
  positioning at least a connection element between said first section and said second section, wherein said connection element has at least a first portion associable with said first section and at least a second portion associable with said second section;
  positioning at least a template in correspondence of said first and second sections and fixing at least a first predefined portion of said template to a corresponding predefined portion of said first section and at least a second predefined portion of said template to a corresponding predefined portion of said second section;
  fixing said first portion of the connection element to said first section and said second portion of said connection element to said second section;
  removing said template from said first and second sections.

7. The procedure according to claim 6, further comprising a step of fixing at least a third section having at least an electronic module or device to at least one of said first section and said second section, wherein said third section is arranged substantially aligned with said first section and with said second section along said longitudinal axis.

8. The procedure according to claim 7, further comprising a step of positioning at least a substantially tubular and elongated covering element around said first and second sections and along said longitudinal axis.

9. The procedure according to claim 8, further comprising the steps of:
  positioning at least a first seal between said first section and the edge of a first extremal opening of said covering element;
  positioning at least a second seal between said second section and the edge of a second extremal opening of said covering element.

10. The procedure according to claim 6, wherein said step of fixing comprises locking said first portion of the connection element to said first section and said second portion of said connection element to said second section by means of threaded means.

11. The procedure according to claim 10, wherein said template comprises at least a through opening made in correspondence of said first and/or second portion of the connection element and able to allow the screwing of said threaded means.

12. The procedure according to claim 11, wherein said template is substantially plate-shaped.

* * * * *